(12) United States Patent
McMillen et al.

(10) Patent No.: US 7,984,949 B2
(45) Date of Patent: Jul. 26, 2011

(54) LUMBAR AND BOLSTER SUPPORT FOR SECOND ROW SEAT

(75) Inventors: Robert J. McMillen, Tecumseh (CA); Stephen M. Certossi, Belle River (CA)

(73) Assignee: Schukra of North America, Lakeshore-Tecumseh, Ontario (CA)

( * ) Notice: Subject to any disclaimer, the term of this patent is extended or adjusted under 35 U.S.C. 154(b) by 435 days.

(21) Appl. No.: 12/109,168

(22) Filed: Apr. 24, 2008

(65) Prior Publication Data

US 2008/0265649 A1    Oct. 30, 2008

Related U.S. Application Data

(60) Provisional application No. 60/913,744, filed on Apr. 24, 2007.

(51) Int. Cl.
*A47C 3/00* (2006.01)
(52) U.S. Cl. .................. 297/284.9; 297/284.1
(58) Field of Classification Search .............. 297/284.9, 297/284.1, 284.4
See application file for complete search history.

(56) References Cited

U.S. PATENT DOCUMENTS

| | | |
|---|---|---|
| 1,182,854 A | 5/1916 | Poler |
| 1,203,293 A | 10/1916 | Wilkinson |
| 2,274,176 A | 2/1942 | Widman |
| 2,756,809 A | 7/1956 | Endresen |
| 2,833,339 A | 5/1958 | Lilijengren |
| 2,843,195 A | 7/1958 | Barvaeus |
| 2,855,984 A | 10/1958 | Majorana et al. |
| 2,942,651 A | 6/1960 | Binding |
| 3,121,585 A | 2/1964 | Krueger et al. |
| 3,202,453 A | 8/1965 | Richards |
| 3,241,879 A | 3/1966 | Castello et al. |
| 3,246,924 A | 4/1966 | Krueger et al. |
| 3,271,076 A | 9/1966 | Smith |
| 3,273,877 A | 9/1966 | Geller et al. |
| 3,363,941 A | 1/1968 | Wierwille |
| 3,378,299 A | 4/1968 | Sandor |
| 3,416,839 A | 12/1968 | Flint |
| 3,490,084 A | 1/1970 | Schuster |
| 3,492,768 A | 2/1970 | Schuster |
| 3,550,953 A | 12/1970 | Neale |
| 3,695,688 A | 10/1972 | Wize |
| 3,724,144 A | 4/1973 | Schuster |
| 3,762,769 A | 10/1973 | Poschl |
| 3,927,911 A | 12/1975 | Rosquist |
| 3,929,374 A | 12/1975 | Hogan et al. |
| 3,938,858 A | 2/1976 | Drabert et al. |
| 3,967,852 A | 7/1976 | Eiselt et al. |
| 3,983,640 A | 10/1976 | Cardullo et al. |
| 3,992,059 A | 11/1976 | Kloepfer |
| 4,040,661 A | 8/1977 | Hogan et al. |
| 4,050,331 A | 9/1977 | Braren et al. |
| 4,105,245 A | 8/1978 | Simons et al. |
| 4,136,577 A | 1/1979 | Borgersen |

(Continued)

FOREIGN PATENT DOCUMENTS

AT    401497    9/1996

(Continued)

*Primary Examiner* — David Dunn
*Assistant Examiner* — Erika Garrett

(57) ABSTRACT

The present invention is a lumbar and bolster support for a seat, especially for an automotive second row seat or a chair back rest. The lumbar and bolster support has a lumbar support member adjustable between a retracted position and an extended position, and a first bolster member and a second bolster member adjustable between a first position and a second position.

12 Claims, 4 Drawing Sheets

U.S. PATENT DOCUMENTS

| | | |
|---|---|---|
| 4,153,293 A | 5/1979 | Sheldon |
| 4,155,592 A | 5/1979 | Tsuda et al. |
| 4,156,544 A | 5/1979 | Swenson et al. |
| 4,182,533 A | 1/1980 | Arndt et al. |
| 4,190,286 A | 2/1980 | Bentley |
| 4,295,681 A | 10/1981 | Gregory |
| 4,313,637 A | 2/1982 | Barley |
| 4,316,631 A | 2/1982 | Lenz et al. |
| 4,354,709 A | 10/1982 | Schuster |
| 4,368,916 A | 1/1983 | Blasin |
| 4,390,210 A | 6/1983 | Wisniewski et al. |
| 4,428,611 A | 1/1984 | Widmer |
| 4,449,751 A | 5/1984 | Murphy et al. |
| 4,452,485 A | 6/1984 | Schuster |
| 4,465,317 A | 8/1984 | Schwarz |
| 4,519,646 A | 5/1985 | Leitermann et al. |
| 4,541,670 A | 9/1985 | Morgenstern et al. |
| 4,555,140 A | 11/1985 | Nemoto |
| 4,556,251 A | 12/1985 | Takagi |
| 4,564,235 A | 1/1986 | Hatsutta et al. |
| 4,565,406 A | 1/1986 | Suzuki |
| 4,576,410 A | 3/1986 | Hattori |
| 4,601,514 A | 7/1986 | Meiller |
| 4,602,819 A | 7/1986 | Morel |
| 4,616,874 A | 10/1986 | Pietsch et al. |
| 4,619,481 A | 10/1986 | Grudzinskas |
| 4,627,661 A | 12/1986 | Ronnhult et al. |
| 4,630,865 A | 12/1986 | Ahs |
| 4,632,454 A | 12/1986 | Naert |
| 4,634,083 A | 1/1987 | McKinnon |
| 4,655,505 A | 4/1987 | Kashiwamura et al. |
| 4,676,550 A | 6/1987 | Neve De Mevergnies |
| 4,679,848 A | 7/1987 | Spierings |
| 4,699,418 A | 10/1987 | Plavetich |
| 4,707,027 A | 11/1987 | Horvath et al. |
| 4,711,490 A | 12/1987 | Brand |
| 4,730,871 A | 3/1988 | Sheldon |
| 4,768,830 A | 9/1988 | Musselwhite |
| 4,826,249 A | 5/1989 | Bradbury |
| 4,833,614 A | 5/1989 | Saitoh et al. |
| 4,834,455 A | 5/1989 | Proctor |
| 4,880,271 A | 11/1989 | Graves |
| 4,909,568 A | 3/1990 | Dal Monte |
| 4,915,448 A | 4/1990 | Morgenstern |
| 4,918,344 A | 4/1990 | Chikamori et al. |
| 4,950,032 A | 8/1990 | Nagasaka |
| 4,957,102 A | 9/1990 | Tan et al. |
| 4,968,093 A | 11/1990 | Dal Monte |
| 4,976,104 A | 12/1990 | Morris et al. |
| 5,005,904 A | 4/1991 | Clemens et al. |
| 5,022,709 A | 6/1991 | Marchino |
| 5,026,116 A | 6/1991 | Dal Monte |
| 5,050,930 A | 9/1991 | Schuster et al. |
| 5,076,643 A | 12/1991 | Colasanti et al. |
| 5,082,326 A | 1/1992 | Sekido et al. |
| 5,088,790 A | 2/1992 | Wainwright et al. |
| 5,092,654 A | 3/1992 | Inaba et al. |
| 5,120,111 A | 6/1992 | Cook |
| 5,137,329 A | 8/1992 | Neale |
| 5,174,526 A | 12/1992 | Kanigowski |
| 5,195,795 A | 3/1993 | Cannera et al. |
| 5,197,780 A | 3/1993 | Coughlin |
| 5,215,350 A | 6/1993 | Kato |
| 5,217,278 A | 6/1993 | Harrison et al. |
| 5,269,581 A | 12/1993 | Odagaki et al. |
| 5,286,087 A | 2/1994 | Elton |
| 5,292,175 A | 3/1994 | Artz |
| 5,292,176 A | 3/1994 | Artz |
| 5,299,851 A | 4/1994 | Lin |
| 5,316,371 A | 5/1994 | Bishai |
| 5,335,965 A | 8/1994 | Sessini |
| 5,368,355 A | 11/1994 | Hayden et al. |
| 5,385,389 A | 1/1995 | Bishai |
| 5,385,531 A | 1/1995 | Jover |
| 5,397,164 A | 3/1995 | Schuster |
| 5,397,167 A | 3/1995 | Fourrey et al. |
| 5,423,593 A | 6/1995 | Nagashima |
| 5,429,558 A | 7/1995 | Lagarde et al. |
| 5,449,219 A * | 9/1995 | Hay et al. ............... 297/284.4 |
| 5,452,868 A | 9/1995 | Kanigowski |
| 5,472,261 A | 12/1995 | Oplenskdal et al. |
| 5,474,358 A | 12/1995 | Maeyaert |
| 5,482,346 A | 1/1996 | Lesourd |
| 5,498,063 A | 3/1996 | Schuster et al. |
| 5,518,294 A | 5/1996 | Ligon, Sr. et al. |
| 5,529,377 A | 6/1996 | Miller |
| 5,553,917 A | 9/1996 | Adat et al. |
| 5,562,324 A | 10/1996 | Massara et al. |
| 5,567,010 A | 10/1996 | Sparks |
| 5,567,011 A | 10/1996 | Sessini |
| 5,570,931 A | 11/1996 | Kargilis et al. |
| 5,588,703 A | 12/1996 | Itou |
| 5,588,707 A | 12/1996 | Bolsworth et al. |
| 5,609,394 A | 3/1997 | Ligon, Sr. et al. |
| 5,626,390 A | 5/1997 | Schuster et al. |
| 5,638,722 A | 6/1997 | Klingler |
| 5,651,583 A | 7/1997 | Klingler et al. |
| 5,651,584 A | 7/1997 | Chenot et al. |
| 5,660,438 A | 8/1997 | Tedesco |
| 5,681,079 A | 10/1997 | Robinson |
| 5,704,687 A | 1/1998 | Klingler |
| 5,718,476 A | 2/1998 | De Pascal et al. |
| 5,730,495 A | 3/1998 | Tuman, II |
| 5,758,925 A | 6/1998 | Schrewe et al. |
| 5,762,397 A | 6/1998 | Venuto et al. |
| 5,769,491 A | 6/1998 | Schwarzbich |
| 5,772,281 A | 6/1998 | Massara |
| 5,775,773 A | 7/1998 | Schuster et al. |
| 5,791,733 A | 8/1998 | Van Hekken et al. |
| 5,816,653 A | 10/1998 | Benson |
| 5,823,620 A | 10/1998 | Le Caz |
| 5,857,743 A | 1/1999 | Ligon, Sr. et al. |
| 5,868,466 A | 2/1999 | Massara |
| 5,884,968 A | 3/1999 | Massara |
| 5,897,168 A | 4/1999 | Bartelt et al. |
| 5,911,477 A | 6/1999 | Mundell et al. |
| 5,913,569 A | 6/1999 | Klingler |
| 5,934,752 A | 8/1999 | Klingler |
| 5,941,602 A | 8/1999 | Sturt et al. |
| 5,967,608 A | 10/1999 | Van Sickle |
| 5,975,632 A | 11/1999 | Ginat |
| 5,984,407 A | 11/1999 | Ligon, Sr. et al. |
| 5,988,745 A | 11/1999 | Deceuninck |
| 6,003,941 A | 12/1999 | Schuster, Sr. et al. |
| 6,007,151 A | 12/1999 | Benson |
| 6,030,041 A | 2/2000 | Hsiao |
| 6,036,265 A | 3/2000 | Cosentino |
| 6,045,185 A | 4/2000 | Ligon, Sr. et al. |
| 6,050,641 A | 4/2000 | Benson |
| 6,079,783 A | 6/2000 | Schuster, Sr. et al. |
| 6,092,871 A | 7/2000 | Beaulieu |
| 6,152,531 A | 11/2000 | Deceuninck |
| 6,152,532 A | 11/2000 | Cosentino |
| 6,158,300 A | 12/2000 | Klingler |
| 6,174,017 B1 | 1/2001 | Salani et al. |
| 6,199,951 B1 | 3/2001 | Zeile et al. |
| 6,227,617 B1 | 5/2001 | Von Möller |
| 6,227,618 B1 | 5/2001 | Ligon, Sr. et al. |
| 6,254,186 B1 | 7/2001 | Falzon |
| 6,254,187 B1 | 7/2001 | Schuster, Sr. et al. |
| 6,270,158 B1 | 8/2001 | Hong |
| 6,296,308 B1 | 10/2001 | Cosentino et al. |
| 6,334,651 B1 | 1/2002 | Duan et al. |
| 6,371,558 B1 | 4/2002 | Couasnon |
| 6,375,255 B1 | 4/2002 | Maruta et al. |
| 6,554,360 B1 | 4/2003 | Wilke et al. |
| 6,648,395 B2 | 11/2003 | Hoshino |
| 6,655,738 B2 | 12/2003 | Kämmerer |
| 6,669,299 B2 | 12/2003 | Carlson et al. |
| 6,695,402 B2 | 2/2004 | Sloan, Jr. |
| 6,736,459 B1 | 5/2004 | Sturt |
| 6,860,561 B2 | 3/2005 | Takata |
| 7,000,986 B2 | 2/2006 | Cruz Fernandes de Pinho |
| 7,140,680 B2 | 11/2006 | McMillen et al. |
| 7,140,681 B2 * | 11/2006 | McMillen ............... 297/284.9 |
| 2003/0085600 A1 | 5/2003 | Mori |
| 2005/0046252 A1 * | 3/2005 | McMillen ............... 297/284.1 |

FOREIGN PATENT DOCUMENTS

| | | |
|---|---|---|
| DE | 2040794 | 7/1971 |
| DE | 2064419 | 7/1972 |
| DE | 2947472 | 8/1980 |
| DE | 4220995 A1 | 1/1994 |
| DE | 4412898 A1 | 10/1995 |
| DE | 19750116 A1 | 5/1999 |
| DE | 29905163 U1 | 7/1999 |
| DE | 10005215 C1 | 9/2001 |
| DE | 10314771 A1 | 10/2004 |
| EP | 0006840 B1 | 2/1982 |
| EP | 0169293 B1 | 10/1988 |
| EP | 0322535 A1 | 7/1989 |
| EP | 0518830 A1 | 12/1992 |
| EP | 0485483 B1 | 1/1994 |
| EP | 0434660 B1 | 5/1995 |
| EP | 0540481 B1 | 12/1995 |
| EP | 0662795 B1 | 12/1996 |
| EP | 0702522 B1 | 3/1997 |
| EP | 0696251 B1 | 7/1997 |
| EP | 0746219 B1 | 11/1998 |
| EP | 0797399 B1 | 11/1998 |
| EP | 0698360 B1 | 3/2000 |
| FR | 2596334 | 10/1987 |
| GB | 1423617 | 2/1976 |
| GB | 2013487 | 2/1978 |
| SU | 587924 | 2/1978 |
| WO | WO/00/00064 | 1/2000 |
| WO | WO 01/48397 | 7/2001 |
| WO | WO03/022626 A1 | 3/2003 |
| WO | WO2004/043207 A2 | 5/2004 |
| WO | WO2004/043730 A2 | 5/2004 |

* cited by examiner

LUMBAR AND BOLSTER SUPPORT FOR SECOND ROW SEAT

CROSS-REFERENCE TO RELATED APPLICATIONS

This application claims priority of U.S. Provisional Application No. 60/913,744 filed Apr. 24, 2007.

BACKGROUND OF THE INVENTION

1. Field of the Invention

The present invention relates to the field of lumbar support systems, especially as such systems are used in automotive seats and chair back rests.

2. Related Art

Lumbar support systems have become a popular feature for use in automotive seats, office chairs, beds, lounge chairs and various other furniture and equipment used for sitting or reclining. Numerous and varied designs of lumbar support systems have been developed and produced.

SUMMARY OF THE INVENTION

The present invention is a lumbar and bolster support for a seat, especially for an automotive second row seat or a chair back rest.

Further areas of applicability of the present invention will become apparent from the detailed description provided hereinafter. It should be understood that the detailed description and specific examples, while indicating the preferred embodiment of the invention, are intended for purpose of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
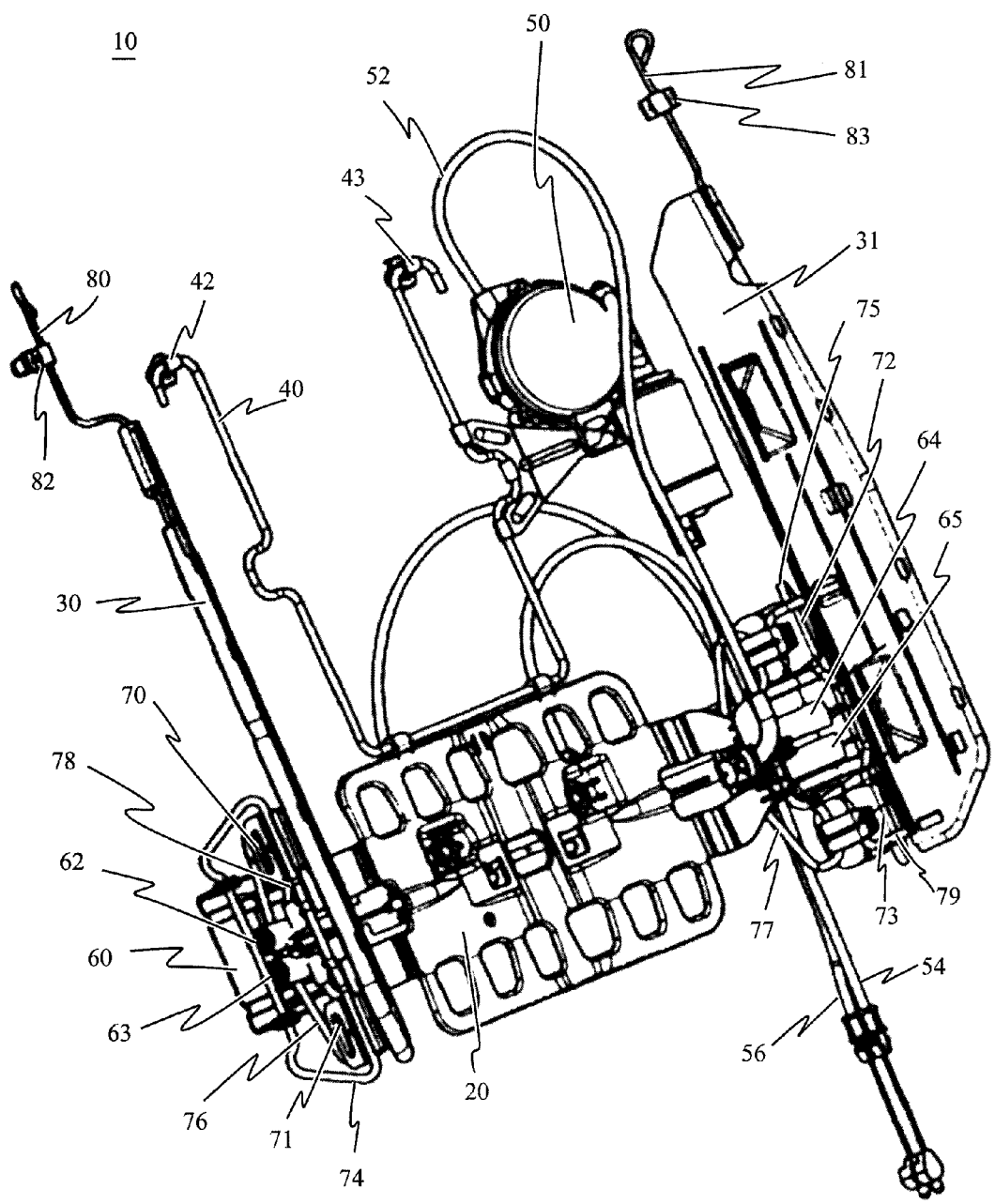
FIG. 1 illustrates a front perspective view of an embodiment of the present invention.

The following description of the preferred embodiment(s) of the present invention is merely exemplary in nature and is in no way intended to limit the present invention, its application, or its uses.

As shown in FIGS. 1-4 an apparatus 10 to provide a lumbar and bolster support in a seat back is provided comprising a lumbar support basket 20, two bolster paddles 30, 31, a suspension wire 40, an actuator 50, a first, second and third bowden cable wire assemblies 52, 54. 56, a center bracket assembly 60, four spring and spring tube assemblies 62, 63, 64, 65, four pivot plates 70, 71, 72, 73, two hinge wires 74, 75, two pivot wires 76, 77, two trim wires 80, 81, two bolster wires 78, 79 and two slider assemblies 90, 91. The spring and spring tube assemblies 62, 63, the pivot plates 70, 71, the hinge wire 74, the pivot wire 76, the bolster wire 78, and the slider assembly 90 are collectively referred to as a first bolster adjustment mechanism, and the spring and spring tube assemblies 64, 65, the pivot plates 72, 73, the hinge wire 75, the pivot wire 77, the bolster wire 79, and the slider assembly 91 are collectively referred to as a second bolster adjustment mechanism.

According to the depicted embodiment an upper portion of the suspension wire 40 is attached by clips 42, 43 to a seat back (not shown) and a lower portion is hingedly attached to the lumbar support basket 20 as best seen in FIG. 1. Although the suspension wire 40 is depicted as a generally U-shaped wire, it need not be limited to a U-shaped wire. The lumbar support basket 20 is preferably designed such that it is naturally biased in a retracted position, for example by making it at least in part out of elastic material. The lumbar support basket 20 preferably has a number of through-holes as depicted. The sides of the lumbar support basket 20 are hingedly attached to the two pivot wires 76, 77, respectively, as best seen in FIG. 2.

The pivot wires 76; 77 are in turn hingedly connected to the four pivot plates 70, 71; 72, 73, two on each side. Two pivot plates 70, 71; 72, 73 are connected to each bolster wire 78; 79 on its respective side. The pivot plates 70, 71; 72, 73 connect to the bolster wire 78; 79 preferably at a middle portion of the bolster wire 78; 79 on its respective side. Outer portions of the two bolster wires 78, 79 are fixed to the two bolster paddles 30, 31, respectively. Inner portions of the two bolster wires 78, 79 are hingedly attached to the two slider assemblies 90, 91, respectively. The two slider assemblies 90, 91 are slidable with respect to the center bracket assembly 60. The two bolster paddles 30, 31 are fixed to the two trim wires 80, 81, respectively. The two trim wires 80, 81 are slideably connected to two clips 82, 83, which are attached to a seat frame (not shown). The two pivot plates 70, 71; 72, 73 are also hingedly connected to the hinge wire 74; 75, on its respective side. The two hinge wires 74, 75 are both hingedly connected to opposite sides of the center bracket assembly 60 as best seen in FIG. 2. Accordingly, when the slider assemblies 90, 91 slide with respect to the center bracket assembly 60, the two bolster paddles 30, 31 are moved between a first position and a second position.

Figure 2:
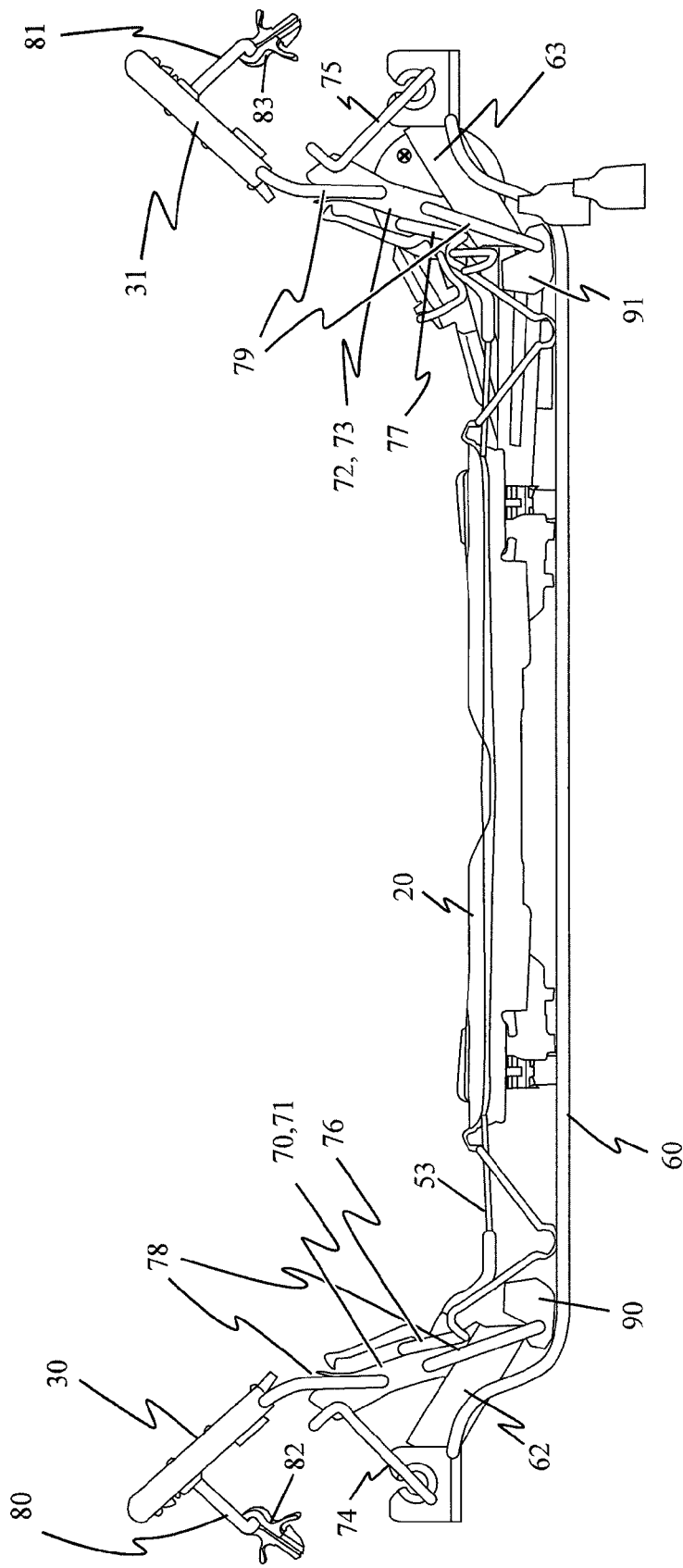
FIG. 2 illustrates a bottom view the embodiment of FIG. 1.
Figure 3:
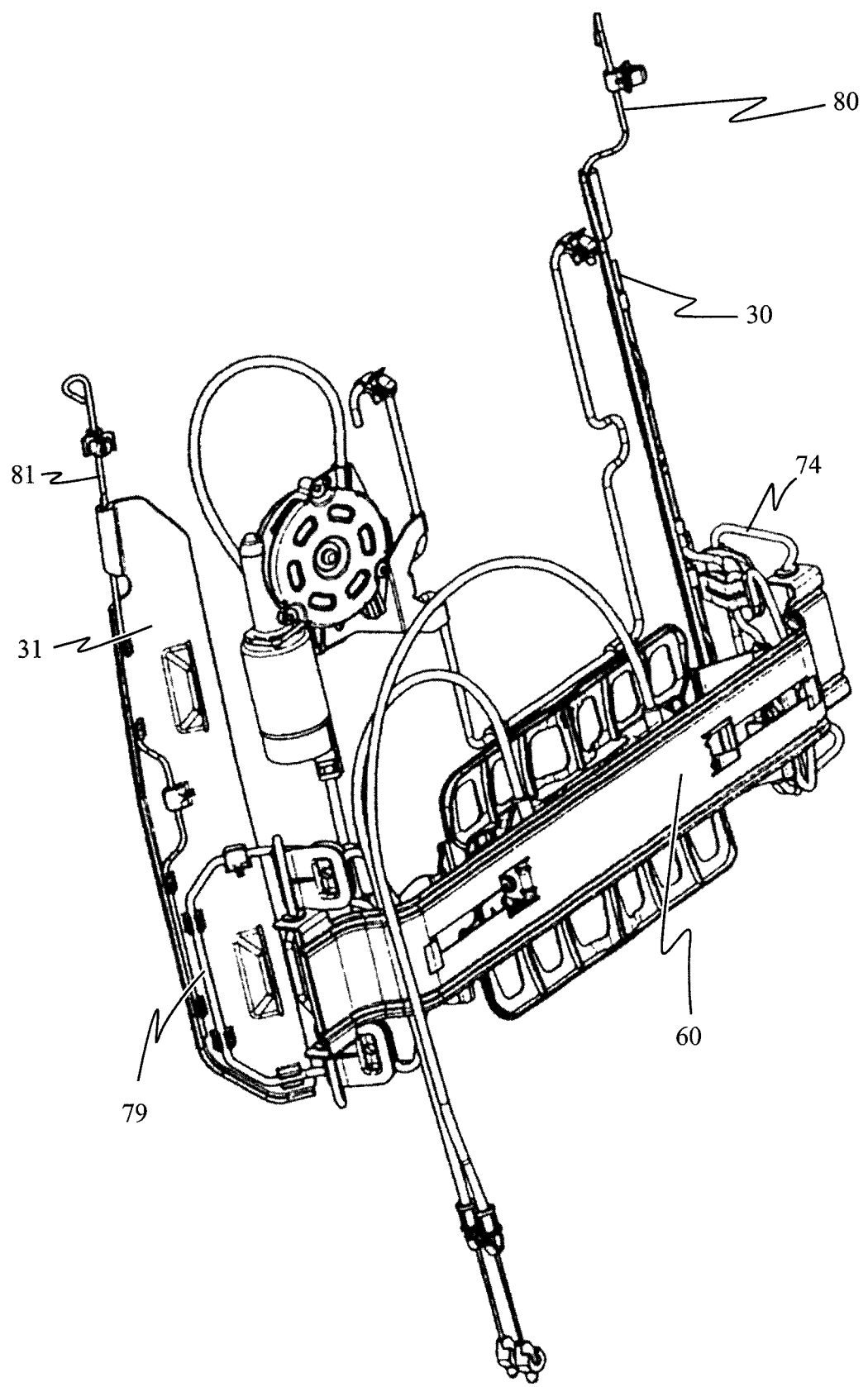
FIG. 3 illustrates a back perspective view of the embodiment of FIG. 1.

Preferably, two spring assemblies 62, 63; 64, 65 on each side of the center bracket assembly 60 are attached such that one end of each spring is fixed with respect to a portion of the hinge wire 74, 75, and the other end is fixed with respect to a portion of the respective slider assembly 90, 91 as best seen in FIG. 2, thereby biasing the two bolster paddles 30, 31 in the first position.

Figure 4:
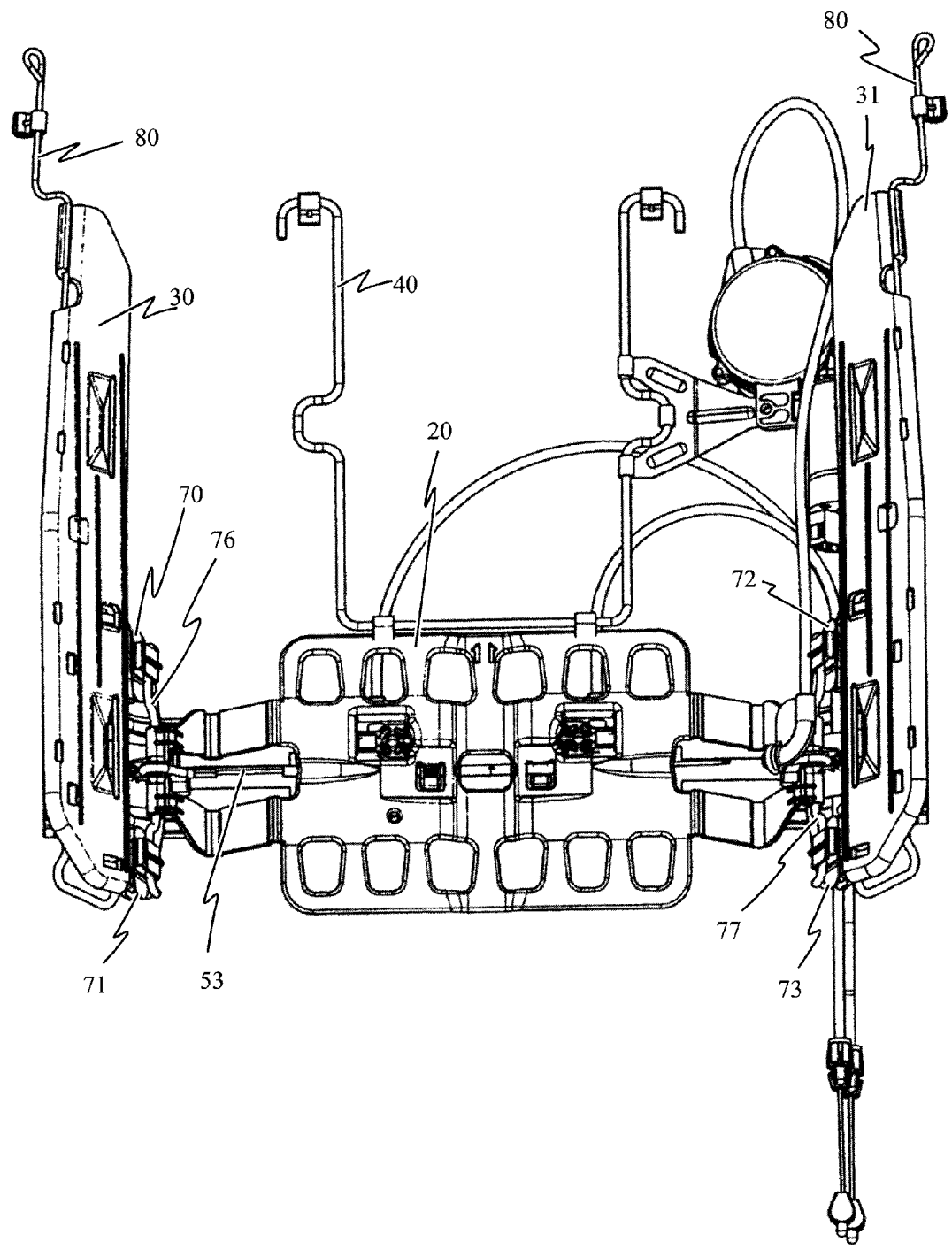
FIG. 4 illustrates a front view of the embodiment of FIG. 1.

The actuator 50 is attached to the suspension wire 40. A first end of the first bowden cable 52 is operatively connected to the actuator 50. The second end of the conduit portion of the first bowden cable assembly 52 is fixed with respect to a first pivot wire 77. The second end of the wire portion 53 of the first bowden cable assembly 52 is fixed with respect to a second pivot wire 76 as best seen in FIGS. 2 and 4. A portion of the wire 53 of the first bowden cable assembly 52 runs through a channel in the lumbar support basket 20 such that when tension is applied to the wire 53, the lumbar support basket 20 is moved to an extended position. Preferably, when such tension is removed the lumbar support basket 20 is moved back to the retracted position due to its natural bias.

The conduit portions of the second and third bowden cable assemblies 54, 56 are fixed with respect to the center bracket assembly 60. The wire portions of the second and third bowden cable assemblies 54, 56 are attached to the slider assemblies 90, 91, respectively. Accordingly, when tension is applied to the wire portions of the second and third bowden cable assemblies 54, 56, the slider assemblies 90, 91 are moved slidingly with respect to the center bracket assembly

60 such that the two bolster paddles 30, 31 are moved from the first position to the second position.

As various modifications could be made to the exemplary embodiments, as described above with respect to the corresponding illustrations, without departing from the scope of the present invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lumbar support for a seat comprising:
   a lumbar support member;
   a first bolster member and a second bolster member; and
   a first bolster adjustment mechanism and a second bolster adjustment mechanism;
   wherein said lumbar support member is adjustable between a retracted position and an extended position;
   wherein said first and second bolster adjustment mechanisms connect said first and second bolster members to said lumbar support member, respectively, and adjust said first and second bolster members between a first position and a second position, respectively;
   an actuator connected to said lumbar support member, wherein said actuator actuates said lumbar support member to be adjusted between said retracted position and said extended position and said first and second bolster members to be adjusted between said first position and said second position;
   a first bowden cable;
   a second bowden cable; and
   a third bowden cable,
   wherein said first bowden cable moves said lumbar support member between said retracted position and said extended position; and
   wherein said second bowden cable moves said first bolster member between said first position and said second position, and
   wherein said third bowden cable moves said second bolster member between said first position and said second position.

2. The lumbar support of claim 1 further comprising a center bracket assembly;
   wherein said first and second bolster adjustment mechanisms respectively comprises:
   a first pivot member and a second pivot member;
   a first bolster connection member and a second bolster connection member;
   a first hinge member and a second hinge member; and
   a first slider assembly and a second slider assembly;
   wherein said first and second slider assemblies are slidable with respect to said center bracket assembly;
   wherein said lumbar support member has a first side and a second side, said first and second sides being hingedly attached to said first and second pivot members, respectively;
   wherein said first and second pivot members are connected to said first and second bolster connection members, respectively, outer portions of said first and second bolster connection members being fixed to said first and second bolster members, respectively, inner portions of said first and second bolster connection members being hingedly attached to said first and second slider assemblies, respectively; and
   wherein said first and second hinge members are hingedly connected to said first and second pivot members on one side, and hingedly connected to said center bracket assembly on the other side.

3. The lumbar support of claim 2 further comprising a first spring assembly and a second spring assembly;
   wherein said first and second spring assemblies are hingedly connected to a portion of said first and second hinge members on one side, and hingedly connected to said first and second slider assemblies on the other side, such that said first and second spring assemblies bias said first and second bolster members in said first position, respectively.

4. The lumbar support of claim 3, wherein said first and second pivot members comprise a first pivot wire and a second pivot wire, respectively.

5. The lumbar support of claim 3, wherein each of said first and second bolster connection members comprises a bolster wire, and each of said first and second hinge members comprises hinge wire.

6. The lumbar support of claim 3 further comprising an actuator;
   wherein a first end of said first bowden cable is operatively connected to said actuator, a second end of a conduit portion of said first bowden cable is fixed with respect to said first pivot member, and the second end of a wire portion of said first bowden cable is fixed with respect to said second pivot member, such that when tension is applied to the wire portion of the first bowden cable, said lumbar support member is moved to said extended position.

7. The lumbar support of claim 6 wherein said lumbar support member is designed such that it is naturally biased in said retracted position.

8. The lumbar support of claim 2, wherein each of said first and second pivot members further comprises at least one pivot plate.

9. The lumbar support of claim 2 further comprising an actuator;
   wherein a first end of said second and third bowden cables are operatively connected to said actuator, a second end of a conduit portions of said second and third bowden cables are fixed with respect to said center bracket assembly, a second end of wire portions of said second and third bowden cables are fixed with respect to said first and second slider assemblies, respectively, such that when tension is applied to the wire portions of said first and second bowden cables, said first and second bolster members are moved from said first position to said second position.

10. A lumbar support for a seat comprising:
    a first bolster member and a second bolster member adjustable between a first position and a second position;
    a center bracket assembly;
    a first bolster connection member and a second bolster connection member;
    a first hinge member and a second hinge member; and
    a first slider assembly and a second slider assembly;
    wherein outer portions of said first and second bolster connection members are fixed to said first and second bolster members, respectively, and inner portions of said first and second bolster connection members are hingedly attached to said first and second slider assemblies, respectively; and
    wherein said first and second hinge members are hingedly connected with respect to said first and second bolster connection members on one side, and hingedly connected with respect to said center bracket assembly on the other side; and wherein said first and second slider assemblies are slidable with respect to said center bracket assembly, such that when said first and second slider assemblies slide with respect to said center bracket assembly, said first and second bolster members are moved between said first position and said second position.

11. The lumbar support of claim 10 further comprising:

a lumbar support member;

a first pivot member and a second pivot member;

wherein said lumbar support member has a first side and a second side, said first and second sides being hingedly attached to said first and second pivot members, respectively; and wherein said first and second pivot members are connected to said first and second bolster connection members, respectively.

12. The lumbar support of claim 11 further comprising an actuator and at least one bowden cable;

wherein said at least one bowden cable is operatively connected to said actuator on one side and to said slider assemblies and said center bracket assembly on the other side, such that when said actuator applies tension to a wire portion of said at least one bowden cable, at least one of said first and second bolster members are moved from said first position to said second position.

* * * * *